Aug. 17, 1965 S. Z. SMITH 3,201,009
METERING DISPENSER
Filed Oct. 7, 1963 2 Sheets-Sheet 1

INVENTOR.
Sidney Z. Smith
BY
Roberts, Cushman & Grover
ATT'YS

United States Patent Office 3,201,009
Patented Aug. 17, 1965

3,201,009
METERING DISPENSER
Sidney Z. Smith, Worcester, Mass., assignor to Dennison Manufacturing Company, Framingham, Mass., a corporation of Nevada
Filed Oct. 7, 1963, Ser. No. 314,138
4 Claims. (Cl. 222—443)

This invention relates to a device for metering a predetermined amount of material from a container and then dispensing the measured amount. While the invention is applicable to liquid containers it is particularly intended for use with powdered or granulated material such as flour and sugar.

Objects of the invention are to produce a device which is simple and economical to produce, which permits continuous pouring as well as intermittent metering and which is durable and reliable in use.

According to this invention the dispenser comprises a cap for the container which may be either integral with the container or removable therefrom, the top of the cap having upper and lower portions at different levels and in different sectors, the cap having vertical walls bridging the peripheries of the two portions, together with a cover rotatably mounted on the cap to turn back and forth between metering and dispensing positions, the top of the cover also having upper and lower parts in different sectors, the cover having vertical walls bridging the peripheries of the two parts, the aforesaid upper part extending throughout a larger sector than the aforesaid upper portion to provide a metering space between the cap and cover, the cover having a dispensing opening in said upper part which is closed by said dispensing opening in the aforesaid upper part which is closed by the aforesaid upper portion when the cover is in metering position, and the cap having a pouring opening in the aforesaid lower portion which is covered by the aforesaid lower part when the cover is in dispensing position, whereby a measured amount of material may be poured into the aforesaid space through the aforesaid pouring opening when the cover is in metering position and a measured amount may then be poured from the aforesaid space through the dispensing opening when the cover is in dispensing position. Preferably the sector of the upper portion of the cap and the lower part of the cover each approximates a quadrant so that the cover can be turned to three positions 90° apart, two extreme positions and an intermediate position, the pouring opening in the cap being in the quadrant adjacent that of the upper portion and the pouring opening in the cover being in the quadrant opposite that of the lower part, whereby the pouring opening in the cap is open and the dispensing opening in the cover is closed in the intermediate position, the pouring opening in the cap is closed and the pouring opening in the cover is opened in one extreme position, and both openings are open in the other extreme position for continuous pouring.

In a more specific aspect the top of the cap has top, bottom and intermediate portions at different levels and in different sectors, the cap having vertical walls bridging the peripheries of the portions, together with a cover rotatably mounted on the cap to turn back and forth between metering and dispensing positions, the top of the cover having top and bottom parts in different sectors, the cover having vertical walls bridging the peripheries of the two parts, the top part extending throughout a larger sector than the top portion to provide a metering space between the cap and cover, the cover having a dispensing opening in its top part which is closed by the top portion of the cap when the cover is in metering position, and the cap having a pouring opening in its intermediate portion which is covered by the intermediate part of the cover when the cover is in dispensing position. Preferably the sector of the top and bottom portions of the cap and the bottom part of the cover each approximates a quadrant so that the cover can be turned to three positions 90° apart, two extreme positions and an intermediate position, the top and bottom portions of the cap being in adjacent quadrants, the pouring opening in the cap being in the intermediate portion and the pouring opening in the cover being in the top part. When the cover has only two levels the bottom part of the cover is at the same level as the bottom portion of the cap.

For the purpose of illustration a typical embodiment of the invention is shown in the accompanying drawings in which FIG. 1 is a plan view with the cover in metering position;

Figure 4:
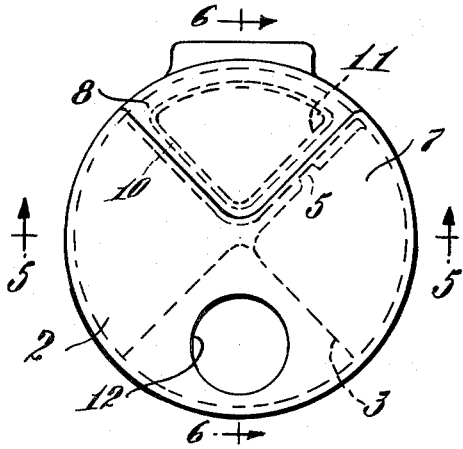
FIG. 4 is a plan view with the cover turned 90° clockwise to dispensing position.

The particular embodiment of the invention chosen for the purpose of illustration comprises a cap 1 and a cover 2 telescoping over the cap. As shown in the drawings the cap telescopes over the container, but it may be threaded on the container or be integral therewith. The top of the cap has three portions at different levels and in different quadrants, a top portion 3 at an upper level in the right quadrant of FIG. 1, a lower portion 4 in the lower quadrants of FIG. 1 and an intermediate portion 6 at an intermediate level. The cover 2 also has two parts at upper and lower levels, a top part 7 bearing on the top portion 3 of the cap and extending throughout the upper, right and lower quadrants in FIG. 1 and a lower part 8 in the left quadrant of FIG. 1 adapted to bear on the intermediate portion 6 of the cap when the cover is turned to dispensing position. The intermediate portion 6 of the cap has an opening 11 and the upper part 7 of the cover has an opening 12 opposite the lower part 8. Between the cap and cover is a space 13 which serves as a metering space. As shown in the top portion 3 and bottom portion 4 extend through quadrants and the intermediate portion 6 extends through a sector of 180°. However the intermediate portion 6 may extend through only a quadrant but together with the bottom portion 4 extend through 180°. The top portion 3 has a protuberance 5 engageable with the side wall of the lower part 8 of the cover when the cover is turned to the dispensing position shown in FIG. 4, thereby to prevent material from being compacted between the opposed walls of the cap and cover. The opening 11 has a surrounding rim 10 so that the lower part 8 of the cover bears only on the edge of the rim instead of the entire area of the intermediate portion 6 of the cap.

Figure 1:
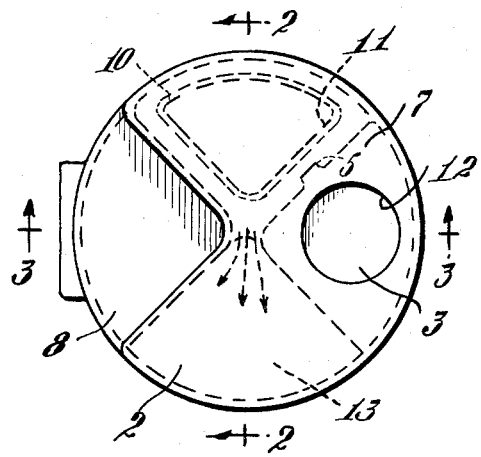
Figure 2:
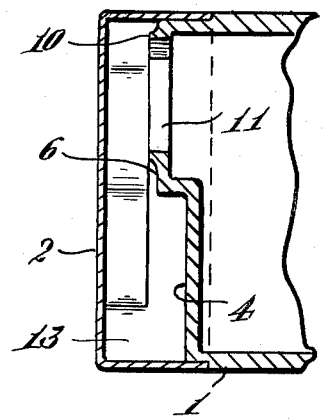
FIG. 2 is a section on line 2—2 of FIG. 1.
Figure 3:
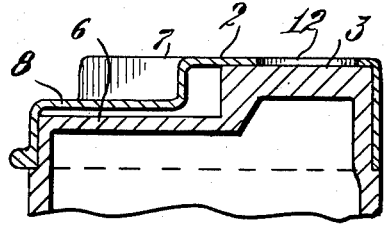
FIG. 3 is a section on line 3—3 of FIG. 1.
Figure 5:
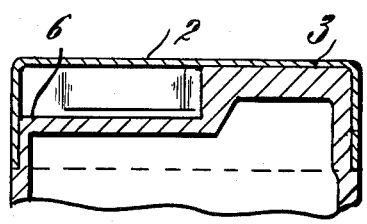
FIG. 5 is a section on line 5—5 of FIG. 4.
Figure 6:
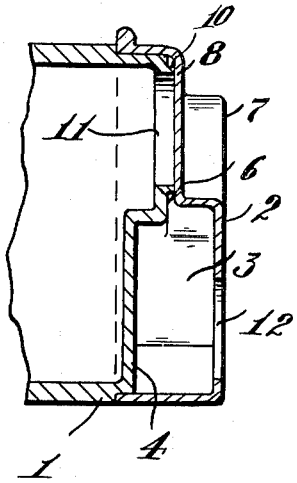
FIG. 6 is a section on line 6—6 of FIG. 4.
Figure 7:
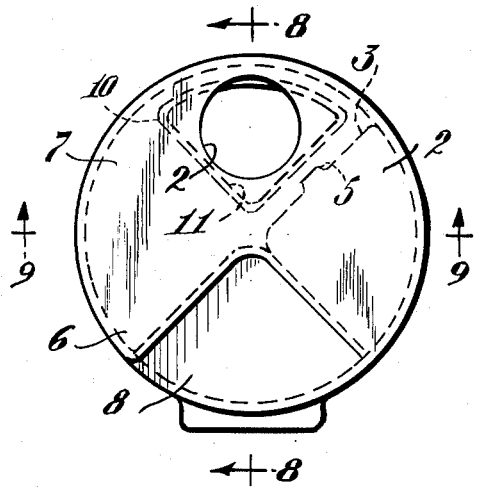
FIG. 7 is a plan view with the cover turned counterclockwise 90° from the position shown in FIG. 1 to pouring position.
Figure 8:
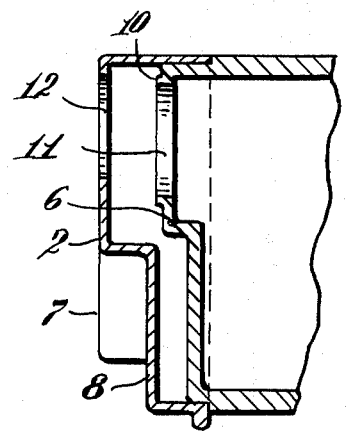
FIG. 8 is a section on line 8—8 of FIG. 7.
Figure 9:
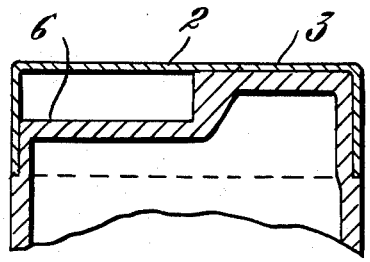
FIG. 9 is a section on line 9—9 of FIG. 7.
Figure 10:
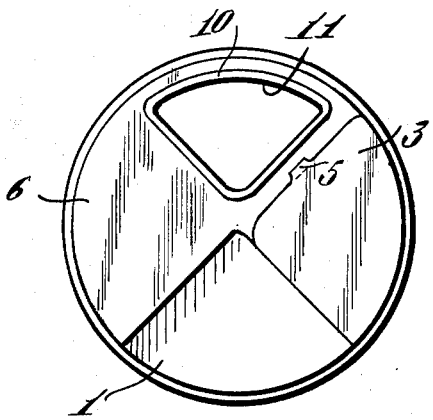
FIG. 10 is a plan view of the cap with the cover removed.
Figure 11:
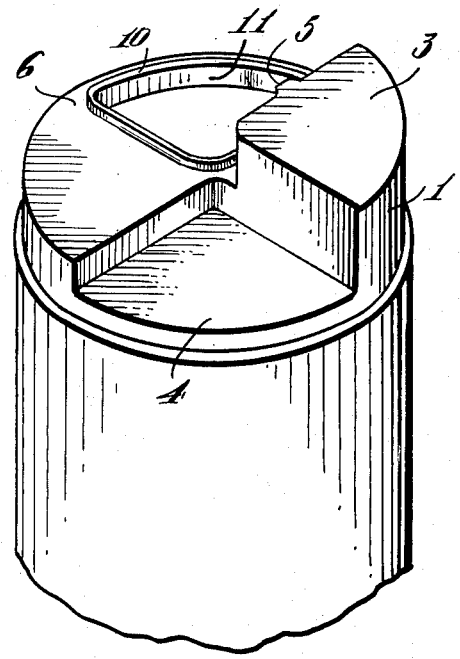
FIG. 11 is an isometric view of the cap with the cover removed.

To meter a predetermined quantity of material the cover 2 is turned to the position shown in FIGS. 1, 2 and 3 wherein the opening 11 is opened and the opening 12 is closed by the top portion 3 of the cap. In this position of the cover material may be poured through the opening 11 into the space 13 as indicated by the arrow in FIG. 1. To dispense the measured amount of material the cover is turned 90° clockwise to the position shown in FIGS. 4, 5 and 6 wherein the opening 11 is closed and the opening 12 is opened so that the measured quantity of material may be poured from the dispenser through the opening 12. By turning the cover 2 90° counterclockwise to the position shown in FIGS. 7, 8 and 9 both the openings 11 and 12 are opened so that material may be poured continuously from the dispenser. The cap is preferably made of transparent material so that the user may see how much material is poured into the metering space 13 and the space may be filled either entirely or partially as desired.

It should be understood that the present disclosure is for the purposes of illustration only and that this invention includes all modifications and equivalents which fall within the scope of the appended claims.

I claim:

1. For a container, a metering dispenser comprising a cap for the container, the top of the cap having upper and lower portions at different levels and in different sectors, the cap having vertical walls bridging the peripheries of the two portions, a cover rotatably mounted on the cap to turn back and forth between metering and dispensing positions, the top of the cover also having upper and lower parts in different sectors, the cover having vertical walls bridging the peripheries of the two parts, said upper part extending throughout a larger sector than said upper portion to provide a metering space between the cap and cover, the cover having a dispensing opening in said upper part which is closed by said upper portion when the cover is in metering positon, and the cap having a pouring opening in said lower portion which is covered by said lower part when the cover is in dispensing position, whereby a measured amount of material may be poured into said space through said pouring opening when the cover is in metering position and the measured amount may be poured from said space through said dispensing opening when the cover is in dispensing position.

2. A dispenser according to claim 1 wherein the sector of said upper portion of the cap and said lower part of the cover each approximates a quadrant so that the cover can be turned to three positions 90° apart, two extreme positions and an intermediate position, the pouring opening in the cap being in the quadrant adjacent that of the upper portion and the pouring opening in the cover being in the quadrant opposite that of the lower part, whereby the pouring opening in the cap is open and the dispensing opening in the cover is closed in the intermediate position, the pouring opening in the cap is closed and the pouring opening in the cover is open in one extreme position, and both openings are open in the other extreme position.

3. For a container, a metering dispenser comprising a cap for the container, the top of the cap having top, bottom and intermediate portions at different levels and in different sectors, the cap having vertical walls bridging the peripheries of the portions, a cover rotatably mounted on the cap to turn back and forth between metering and dispensing positions, the top of the cover also having top and bottom parts in different sectors, the cover having vertical walls bridging the peripheries of the two parts, said top part extending throughout a larger sector than said top portion to provide a metering space between the cap and cover, the cover having a dispensing opening in said top part which is closed by said top portion when the cover is in metering position, and the cap having a pouring opening in said bottom portion which is covered by said intermediate part when the cover is in dispensing position, whereby a measured amount of material may be poured into said space through said pouring opening when the cover is in metering position and the measured amount may be poured from said space through said dispensing opening when the cover is in dispensing position.

4. A dispenser according to claim 3 wherein the sector of said top and bottom portions of the cap and said bottom part of the cover each approximates a quadrant so that the cover can be turned to three positions 90° apart, two extreme positions and an intermediate position, the top and intermediate portions of the cap being in adjacent quadrants, the pouring opening in the cap being in the intermediate portion and the pouring opening in the cover being in the top part, whereby the pouring opening in the cap is open and the dispensing opening in the cover is closed in the intermediate position, the pouring opening in the cap is closed and the pouring opening in the cover is open in one extreme position, and both openings are open in the other extreme position.

References Cited by the Examiner

UNITED STATES PATENTS

| | | | | |
|---|---|---|---|---|
| 2,209,954 | 8/40 | Bennett | | 222—362 |
| 2,904,230 | 9/59 | Worth | | 222—452 |
| 3,055,559 | 9/62 | Allison | | 222—452 |

LOUIS J. DEMBO, *Primary Examiner.*